(12) United States Patent
Robertson (10) Patent No.: US 10,024,453 B2
(45) Date of Patent: Jul. 17, 2018

(54) DUAL ACTING SOLENOID VALVE USING BI-STABLE PERMANENT MAGNET ACTIVATION FOR ENERGY EFFICIENCY AND POWER VERSATILITY

(71) Applicant: Glen A. Robertson, Madison, AL (US)

(72) Inventor: Glen A. Robertson, Madison, AL (US)

( * ) Notice: Subject to any disclaimer, the term of this patent is extended or adjusted under 35 U.S.C. 154(b) by 0 days.

(21) Appl. No.: 15/210,987

(22) Filed: Jul. 15, 2016

(65) Prior Publication Data
US 2018/0017179 A1  Jan. 18, 2018

(51) Int. Cl.
*F16K 31/06* (2006.01)
*F16K 31/08* (2006.01)
*H01F 7/06* (2006.01)

(52) U.S. Cl.
CPC ........ *F16K 31/0655* (2013.01); *F16K 31/082* (2013.01); *H01F 7/064* (2013.01); *Y10T 137/87161* (2015.04)

(58) Field of Classification Search
CPC ..... Y10T 137/87161; Y10T 137/87153; F16K 31/0655; F16K 31/082; H01F 7/064; H01F 7/1615; H01F 7/122; H01F 7/1646
USPC .................................. 251/65; 335/234, 229
See application file for complete search history.

(56) References Cited

U.S. PATENT DOCUMENTS

| | | | | |
|---|---|---|---|---|
| 2,934,090 A * | 4/1960 | Kenann | ................. | F16K 11/044 137/312 |
| 3,022,450 A * | 2/1962 | Chase, Jr. | ............. | H01F 7/1615 29/527.6 |
| 3,202,886 A * | 8/1965 | Kramer | ................. | H01F 7/1615 310/14 |
| 3,203,447 A * | 8/1965 | Bremner | ............. | F16K 31/0627 137/595 |
| 3,368,788 A * | 2/1968 | Padula | ................ | F16K 31/0658 251/129.15 |
| 3,368,791 A * | 2/1968 | Wells | .................. | F16K 31/0655 251/129.07 |
| 3,379,214 A * | 4/1968 | Weinberg | ............. | F16K 31/082 137/625.5 |
| 3,443,585 A * | 5/1969 | Reinicke | ................ | F16K 31/06 137/595 |
| 3,460,081 A * | 8/1969 | Tillman | ................ | H01F 7/1615 335/234 |
| 3,503,022 A * | 3/1970 | Burdett | ..................... | H01F 7/08 335/256 |
| 3,532,121 A * | 10/1970 | Sciortino | .............. | F16K 31/082 137/625.4 |
| 3,634,735 A * | 1/1972 | Komatsu | ............... | H01F 7/1646 335/234 |
| 3,728,654 A * | 4/1973 | Tada | ...................... | H01F 7/1615 335/234 |
| 3,809,123 A * | 5/1974 | Heimann | .............. | F16K 31/082 137/625.5 |
| 3,814,376 A * | 6/1974 | Reinicke | ............... | F16K 31/082 251/129.1 |
| 3,951,378 A * | 4/1976 | Manor | .................. | F16K 31/082 137/625.65 |

(Continued)

*Primary Examiner* — Mary McManmon
*Assistant Examiner* — David Colon Morales (57) ABSTRACT

An dual acting solenoid valve (DASV) is a device for controlling mediums as gases or fluids through two valves simultaneously using a dual position latching solenoid operated with a bi-stable permanent magnet activation system (BSPMAS) to allow the DASV to be electrically energy efficient and power versatile.

2 Claims, 7 Drawing Sheets

(56) References Cited

U.S. PATENT DOCUMENTS

| | | | | |
|---|---|---|---|---|
| 4,097,833 A * | 6/1978 | Myers | ............... | H01F 7/13 335/261 |
| 4,253,493 A * | 3/1981 | English | ............... | F01L 9/04 137/625.18 |
| 4,422,060 A * | 12/1983 | Matsumoto | ............... | H01F 7/13 335/234 |
| 4,538,129 A * | 8/1985 | Fisher | ............... | F16K 31/082 137/625.65 |
| 4,543,991 A * | 10/1985 | Fuchs | ............... | F16K 31/082 137/595 |
| 4,621,660 A * | 11/1986 | Klocke | ............... | F16K 31/082 137/625.44 |
| 4,690,371 A * | 9/1987 | Bosley | ............... | F16K 31/082 251/129.01 |
| 4,751,487 A * | 6/1988 | Green, Jr. | ............... | H01F 7/1615 335/230 |
| 4,829,947 A * | 5/1989 | Lequesne | ............... | F01L 9/04 123/90.11 |
| 4,994,776 A * | 2/1991 | Juncu | ............... | H01F 7/1615 335/230 |
| 5,193,781 A * | 3/1993 | Willbanks | ............... | H01F 7/1646 251/129.1 |
| 5,365,210 A * | 11/1994 | Hines | ............... | H01F 7/1615 335/173 |
| 5,404,908 A * | 4/1995 | Reinicke | ............... | F16K 11/04 137/595 |
| 5,464,041 A * | 11/1995 | Reinicke | ............... | F16K 31/082 137/315.03 |
| 6,265,956 B1 * | 7/2001 | Cascolan | ............... | H01F 7/1615 335/234 |
| 7,021,603 B2 * | 4/2006 | Wygnaski | ............... | F16K 31/0682 251/129.15 |
| 8,228,149 B2 * | 7/2012 | Puth | ............... | H01F 7/1615 335/220 |
| 8,579,250 B1 * | 11/2013 | Theobald | ............... | F16K 31/082 251/129.09 |
| 9,343,216 B2 * | 5/2016 | Robertson | ............... | H01F 7/1615 |
| 2012/0175974 A1 * | 7/2012 | Robertson | ............... | H01F 7/1646 310/12.26 |
| 2013/0328649 A1 * | 12/2013 | Robertson | ............... | H01F 7/08 335/234 |
| 2013/0328650 A1 * | 12/2013 | Robertson | ............... | H01F 7/08 335/234 |
| 2015/0062770 A1 * | 3/2015 | Robertson | ............... | H01F 7/1615 361/147 |

* cited by examiner

DUAL ACTING SOLENOID VALVE USING BI-STABLE PERMANENT MAGNET ACTIVATION FOR ENERGY EFFICIENCY AND POWER VERSATILITY

FIELD OF THE INVENTION

The present invention relates generally to a dual acting solenoid valve (DASV), which is a device for controlling the flow of a gas or fluid medium through two valves simultaneously and driven using a type of bi-stable permanent magnet actuator called a Dual Position Latching Solenoid (DPLS) to reduce the total energy requirement to control the valves, and more particularly to a DASV with the DPLS driven by the pulsed power system known as the Bi-Stable Permanent Magnet Activation System (BSPMAS) to allow the DASV to be energy efficient and power versatile.

BACKGROUND OF THE INVENTION

Electromagnetic or solenoid valves for the dual flow control of a medium of gas or fluid, commonly known as three-way valves, can be found in the art of valves. For example, the MAGNETICALLY OPERATED VALVE of U.S. Pat. No. 3,203,447 by W. C. Bremner etal, 1965 is a three-way valve that operates differently than the THREE-WAY MAGNETIC VALVE of U.S. Pat. No. 2,934,090 by J. G. Kenann etal, 1955. However, these are both valves design to operate off an electromagnet or solenoid singularly. Whereas, the dual acting solenoid valve (DASV) of the present invention is designed to operate two valves simultaneously off of one electromagnet or solenoid, regardless of the number of flow paths of the medium the valve controls. However, the valves that can be used in the present invention needs external accessibility to the stem or shaft that is part of the valve's moving member that controls the flow of the medium. That is, valves like U.S. Pat. No. 3,203,447, wherein the armature r plunger) is enclosed in the device, cannot be used in the present invention, nor is U.S. Pat. No. 3,203,447 designed operate two other valves with its armature. Valves like the three-way valve of U.S. Pat. No. 2,934,090 having a stem (or extension) or the two-way valve of VALVE WITH MAGNETIC ACTUATOR of U.S. Pat. No. 3,368,791 by D. L. Wells, 1964 having an accessible end portion are usable in the present invention.

The DASV of the present invention, uses a bi-stable permanent magnet actuator technique referred to as a Dual Position Latching Solenoid (DPLS) as it has similarity to the DUAL POSITION LATCHING SOLENOID of U.S. Pat. No. 3,022,450 by W. E. Chase, 1958, which contains a solenoid or one or more control coils to cause movement of an armature, a permanent magnet that supplies a hi-stable magnetic flux for alternately magnetically latching the armature against one of two poles, and uses a rapid power pulse to the control coil that allows the power to only be turned on during movement of the armature; making the DPLS energy efficient over conventional solenoids as in U.S. Pat. No. 2,934,090 or U.S. Pat. No. 3,368,791 and possibly over permanent magnet solenoids used in the art of valves. Further, the control coil and permanent magnet arrangement in a DPLS provides a more compact package over the design of conventional solenoids and permanent magnet solenoids of the same magnetic holding force used in the art of valves.

For example, in U.S. Pat. No. 3,203,447 the flux from the control coil is used to repel the magnet armature and in conventional permanent magnet solenoids the flux from the control coil adds or subtracts from the magnetic flux from the permanent magnet, both requiring the force from the magnetic flux to be low in order to keep the coil and thus the input power low. In a DPLS, the flux from the control coil causes the flux from the permanent magnet to be redirected or diverted between one of two paths in the surrounding magnetic material; requiring little power to produce the two magnetic latching positions that provide a balanced bi-directional magnetic force at each latching position. Such that, a DPLS can be designed to have magnetic latching or holding forces against the pressure of the medium much higher than in valves like U.S. Pat. No. 2,934,090 or U.S. Pat. No. 3,368,791 or similar valves with control coils or solenoids of the same size, while requiring lower pulsed power due to the bi-stable dual flux path nature caused by the permanent magnet's position in the DPLS.

To rapidly divert the path of the flux from the permanent magnet in a DPLS without increasing the solenoid or control coils, a pulse capacitor power system is needed. A pulse capacitor power system differs in power delivery from the pass-through capacitive mode shown in FIG. 3 of U.S. Pat. No. 3,203,447, the rectified AC mode of FIG. 13 of U.S. Pat. No. 3,203,447, or the direct battery switch mode in U.S. Pat. No. 3,022,450. The difference is due to the fact that in a pulse capacitor power system, the control coils can be charged to the output voltage before turning on a switch to pass the activation current to ground. That is, in the pass-through capacitive mode of FIG. 3 of U.S. Pat. No. 3,203,447 the capacitor is charged up to the output voltage after switching, in the rectified AC mode of FIG. 13 of U.S. Pat. No. 3,203,447 the activation current is time varying being half off during a cycle, and in U.S. Pat. No. 3,022,450 the direct battery switch mode is known to be slower than a pulsed capacitive mode, such that a battery requires a faster switch to be used to prevent the current from overheating the control coils, whereas the capacitor discharges its power in a rapid pulse. In General, these other patented devices show power circuits that are slower to activate and/or require higher power input verse a pulse capacitor power system.

A pulse capacitor power system developed to power a DPLS is the BI-STABLE PERMANENT MAGNET ACTIVATION SYSTEM (BSPMAS) of U.S. Pat. No. 9,343,216. Together the DPLS and BSPMAS provide a compact, energy efficient and versatile power method for providing the reciprocate actuation required by the present invention.

SUMMARY OF THE INVENTION

The invention is composed primarily of two valves, each attached on opposite sides of a Dual Position Latching Solenoid (DPLS), which is pulsed powered to reciprocate the actions of the armature in the DPLS, which reciprocates the actions of the moving members in the valves that control the flow of the medium through the valve. Using a DPLS to operate two valves reduces the energy requirement over using two separate non-permanent magnet type solenoid valves. The DPLS further reduces the energy requirement by magnetically latching between activations cycles and uses less energy over other permanent magnet type solenoids of the same magnetic force capability due to its bi-stable dual flux path nature.

The dual position latching solenoid (DPLS) has been shown to work at high magnetic holding force with no foreseen upper force limit for use in solenoid valves. Adapting a DPLS to two valves produces an energy efficient DASV with higher holding forces against the pressure of the medium than conventional permanent magnet solenoid valves for controlling the medium through the two valves simultaneously. It is then an objective of the present invention to provide an energy efficient DASV for use in various dual valve applications.

The use of the pulsed capacitive power system known as the BSPMAS to active the control coils of the DPLS allows the DPLS to be versatile powered due to the charging of a capacitor and its rapid discharge into the control coils of the DPLS. The charge time of the capacitor is related to the power of the energy source, where high power electrical sources relates to quick charging time and low power electrical sources relates to slow charging time. Whereby, the power source requires matching to the reciprocation time of the present invention.

Using a BSPMAS to operate the DPLS makes the present invention highly power versatile for controlling the flow of a medium through the two valves. It is then an objective of the present invention to provide a DASV that is highly power versatile for use in various dual valve applications.

It should be understood that the detailed description and specific examples, while indicating the preferred embodiment of the invention, are intended for purposes of illustration only and are not intended to limit the scope of the invention.

Further, it should be understood that the detailed description and specific examples illustrate separate and independent valves about a DPLS, wherein integration of the valves about the DPLS into a less integrated design would still fall within the scope of the invention.

BRIEF DESCRIPTION OF DRAWINGS

The present invention will become more fully understood from the detailed description and the accompanying drawings, wherein:

FIG. 2 illustrates the features of the poppet valve in FIG. 1, where

FIG. 3 illustrates the features of the DPLS in FIG. 1, where

FIG. 5 illustrates the difference in the current traces for a current applied to a conventional solenoid in FIG. 5a and for a current applied to a DPLS in FIG. 5b using the BSPMAS of FIG. 4;

DETAILED DESCRIPTION OF THE INVENTION

Referring now to the drawings, FIGS. 1-7 are provided to facilitate an understanding of the various aspects, features, and power application of the dual acting solenoid valve (DASV) 10 of the present invention using the DUAL POSITION LATCHING SOLENOID (DPLS) 30 of US PUP. 2012/0175974 and the BI-STABLE PERMANENT MAGNET ACTIVATION SYSTEM (BSPMAS) of U.S. Pat. No. 9,343,216 to facilitate operation of the two valves 20a-b. In FIGS. 1-7, the dash boxes represent a combination of features.

It is understood that a DPLS is a bi-stable permanent magnet actuator that uses the flux from the control coils to redirect or divert the flow path of the magnetic flux from the permanent magnet, and does not repel the magnet armature as in done in U.S. Pat. No. 3,203,447 or add or subtract from the magnetic flux of the permanent magnet that attracts the armature as is done in many conventional permanent magnet solenoids.

Figure 1:
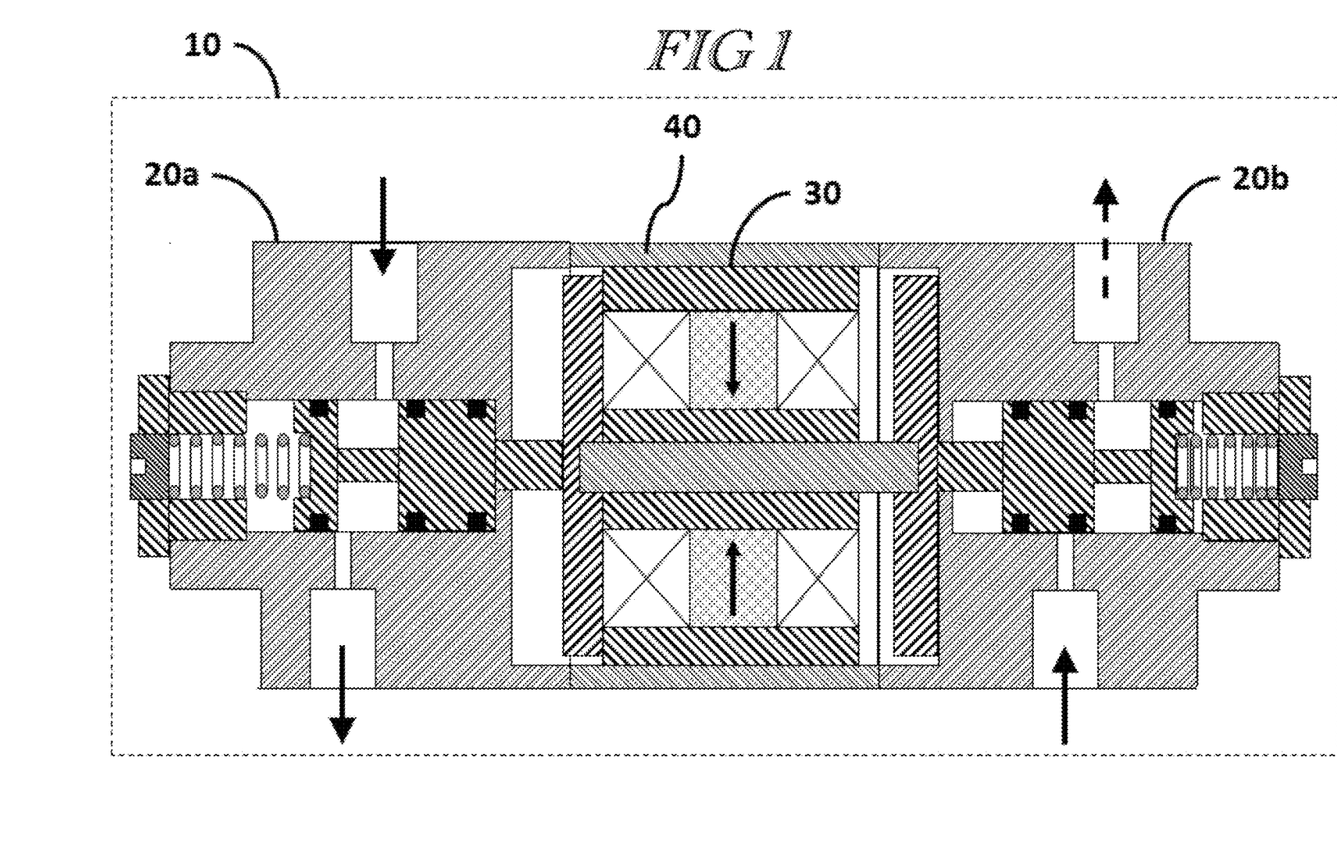
FIG. 1 illustrates the features of the present invention utilizing two poppet type two-way valves and one version of a Dual Position Latching Solenoid (DPLS)

FIG. 1 shows the embodiments of the dual acting solenoid valve (DASV) 10 comprising the two valves 20a-b, the DPLS 30, and a housing 40 firmly holding the DPLS 30 and firmly attached between the two valves 20a-b.

Figure 2A:
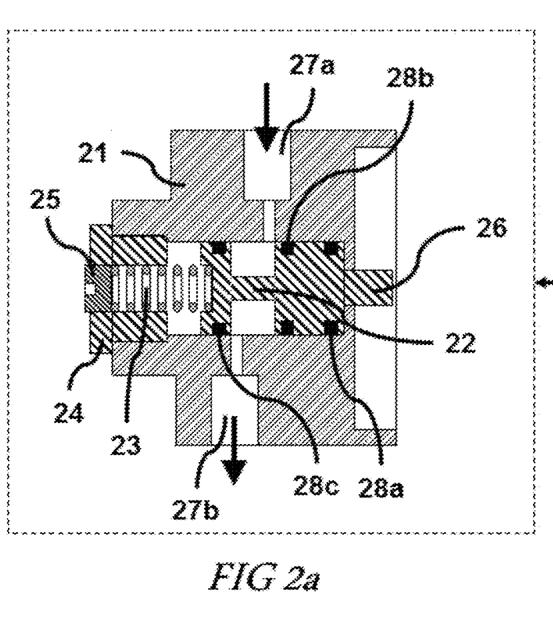
FIG. 2a is a normally opened valve and FIG. 2b is a normally closed valve.
Figure 2B:
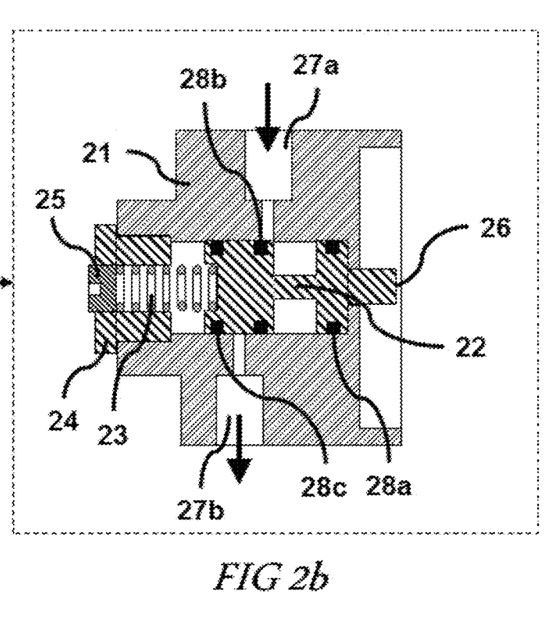

FIG. 2 shows representations of the valve 20 of FIG. 1, which is but one of many valve 20 designs that can be incorporated into the present invention. In FIGS. 2a-b, the valve 20 is a two-way poppet type valve that is a variation of U.S. Pat. No. 3,368,791 with FIG. 2a being a normally open valve and FIG. 2b being a normally closed valve. The valve 20 is comprised of a valve housing 21 of a material commonly used for the type of flow medium applied, a stem or shaft 26 that transfers the force from the DPLS 30 of FIG. 1 to the valve 20, a poppet 22 with O-rings 28a, 28b and 28c that accepts the force on the shaft 26 to control the flow of the medium through the housing 21, a spring 23 to return the poppet 22 to the position shown, a closure 24 with sealing method as an O-Ring to prevent leakage of the medium and holding method as threads to prevent expulsion of the closure 24 from the housing 21 due to the force on the spring 23, a spring adjustment 25 to balance the force on the poppet 22 through the shaft 26, ports 27a-b for in and out flow path of the medium as indicated by the arrows with appropriate threads for connecting with tubing or piping with which the valve 20 is intended to be used.

It is understood that the only difference in the normally open valve of FIG. 2a and normally closed valve of FIG. 2b is the design of the poppet 22.

It is also understood that the poppet 22 and shaft 26 are the moving members in the valve 20 for controlling flow of the medium.

It is further understood that the stem or shaft 26 can be integral to the moving member in a valve.

FIG. 3 show cross-sectional views of the DPLS 30 of US PUP. 2012/0175974 in the two latching positions. The DPLS 30 is cylindrical in shape and comprises: an armature 31 composed of attractive pieces 31a-b, and a shaft 31c firmly attached to the attractive pieces 31a-b; and a permanent-electromagnet composed of a toroidal shaped permanent magnet 32, two control coils 33a-b, two pole pieces 34a-b. The attractive pieces 31a-b and the pole pieces 34a-b are preferably formed of soft iron, steel or some other magnetic material, with the preferred material being one which provides low reluctance, exhibits low hysteresis, and has a high magnetic flux density capability; likewise could be of laminate type construction. The permanent magnet 32 is preferably poled north inward-south outward with the south to north direction given by the direction of the large dark arrow.

Figure 3A:
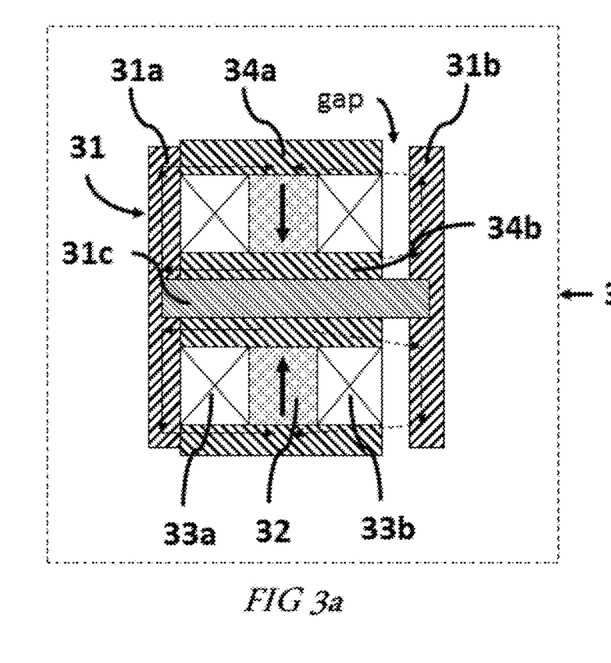
FIG. 3a and FIG. 3b show the two latching positions of the armature in the DPLS.
Figure 3B:
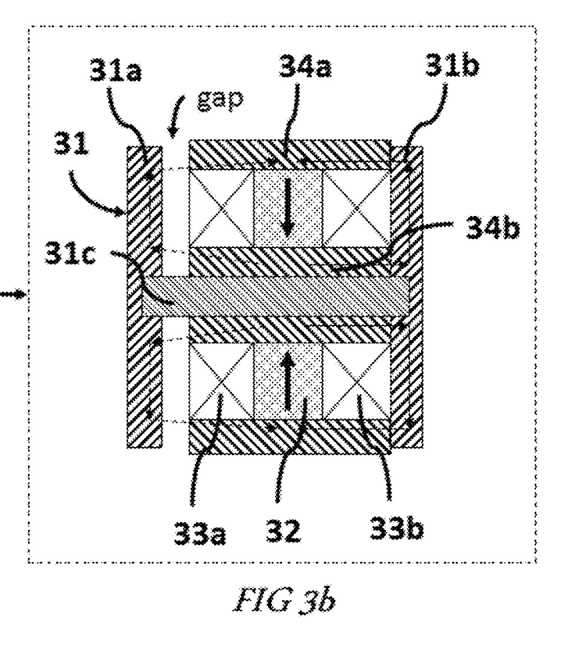

In FIG. 3, the path of the magnetic field from the permanent magnet 32 through the pole pieces 34a-b and attractive pieces 31a-b are illustrated for the magnetically latched attractive piece 31a in FIG. 3a or 3b in FIG. 3b by the thin solid arrows and for a the non-magnetically latched attractive piece 31b in FIG. 3a or 31a in FIG. 3b by the thin dashed arrows. Where the thin solid arrows represent a larger attractive magnetic force between an attractive pieces 31a or 31b and the pole pieces 34a-b than the thin dashed arrows.

It is understood that when current is applied to one or both control coils 33a-b in one direction causes the attractive pieces 31a-b to move from a magnetically latched (31a in FIGS. 3a and 31b in FIG. 3b) to a non-magnetically latched position (31b in FIGS. 3a and 31a in FIG. 3b) and vice versa with oppositely directed applied current.

It is also understood that under no current application to the control coils 33a-b, one attractive pieces 31a or 31b will be magnetically latched to the pole pieces 34a-b and the other attractive pieces 31b or 31a will be non-magnetically latched to the pole pieces 34a-b and separated by a "gap" defined by the difference between the length of shaft 31c and the length of the pole pieces 34a-b.

Figure 4:
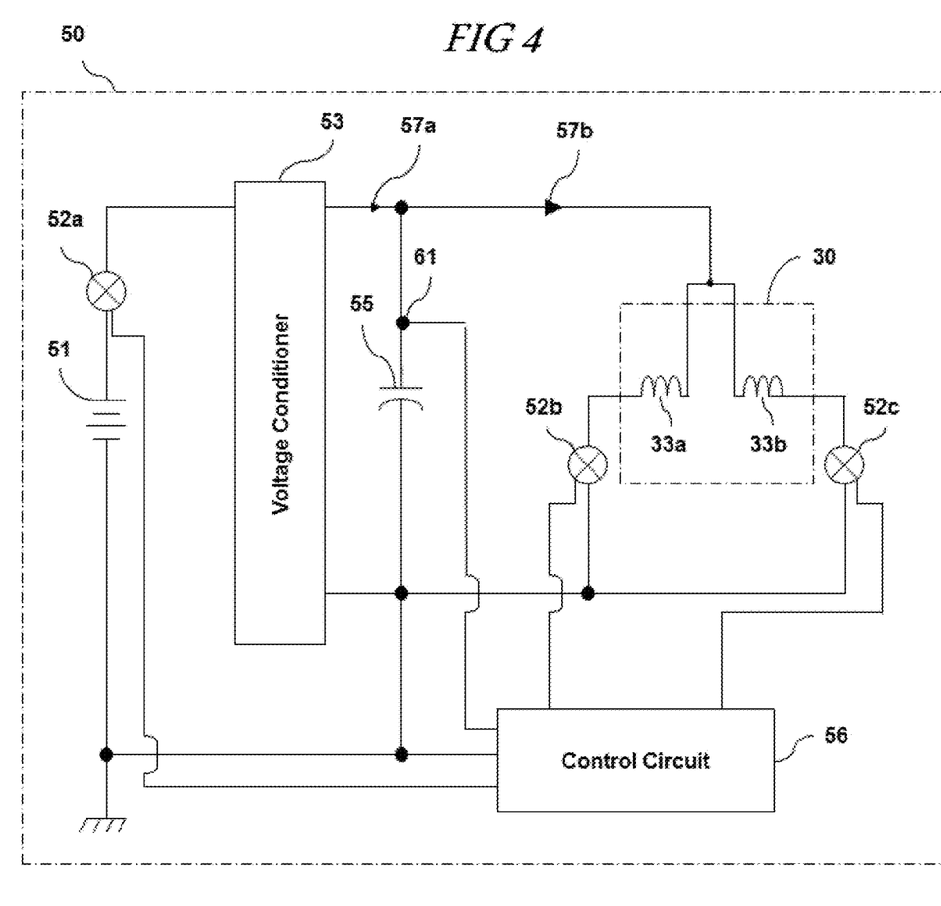
FIG. 4 illustrates the features of a bi-stable permanent magnet activation system (BSPMAS) that can be used with the present invention to activate the control coils in the DPLS to cause movement of the armature in the DPLS.

FIG. 4 presents a slight alternate version of FIG. 2 in the BSPMAS of U.S. Pat. No. 9,343,216. In FIG. 4, the BSPMAS 50 comprises a power source 51, switches 52a, 52b, and 52b, voltage conditioner 53, capacitor 55, and control circuit 56. The high voltage side of the voltage conditioner 53 is connected to the high voltage side of the capacitor 55 and the control coils 33a-b in the DPLS 30 of the present invention as represented by the smaller dash box, whereby the low voltage side of the voltage conditioner 53 and capacitor 55 is connected to the common ground of the power source 51. The control coils 33a-b in the DPLS of the present invention are also connected to the same common ground of the power source 51 through switches 52b-c.

As shown in FIG. 4, when switch 52a is turned on by the control Circuit 56, power from the power source 51 is supplied to the voltage conditioner 53. The voltage conditioner 53 is of design to convert the input voltage supplied by the power source 51 to the output voltage required to operate the present invention by supplying an input current to the capacitor 55, as indicated by the small arrow 57a, and allows the present invention to be used with any electrical power source—making the present invention power versatile. The voltage on the capacitor 55 builds up as the input current is supplied by the voltage conditioner 53, whereby the control circuit 56 may need to monitor the voltage on the capacitor 55, as indicated by the control line from the voltage conditioner 53 to point 61. The capacitor 55 is of design to deliver the output voltage and output current as a power pulse (voltage and current) to operate the present invention when switch 52a or 52b is turned on. The output current, as indicated by the large arrow 57b, from the capacitor 55 is delivered as a discharge current on the order of milli-seconds through the control coils 33a-b in the DPLS 30 of the present invention, when either switch 52b or 52c is turned on by the control circuit 56 to allow the output current to pass to the common ground.

Although other powering circuits and control coil connections can be used, the placement of the switches 52b-c between the control coils 33a-b in the DPLS 30 of the present invention and the common ground has been found to be favorable to the use of solid state switches as the majority of the voltage drop is across the control coils 33a-b.

It is understood that the BSPMAS 50 of FIG. 4 differs in power delivery from the pass-through capacitive, mode shown in FIG. 3 of U.S. Pat. No. 3,203,447, the rectified AC mode of FIG. 13 of U.S. Pat. No. 3,203,447, or the direct battery switch mode in U.S. Pat. No. 3,022,450. The difference is due to the fact that the BSPMAS, as shown in FIG. 4, allows the control coils 33a-b to be charged at the output voltage before turning on the switch 52b or 52c, where the pass-through capacitive mode of FIG. 3 of U.S. Pat. No. 3,203,447 requires the capacitor to charge up after switching, the rectified AC mode of FIG. 13 of U.S. Pat. No. 3,203,447 produces a time varying current being half off during a cycle, and in U.S. Pat. No. 3,022,450 the direct battery switch mode is slower than the pulsed capacitive mode, such that it requires a fast switch to prevent the current from overheating the control coils 33a-b, whereas the capacitor 55 discharges a rapid pulse, which bleeds to zero current as shown in FIG. 5b, preventing overheating of the control coils 33a-b.

Figures 5, 5B:
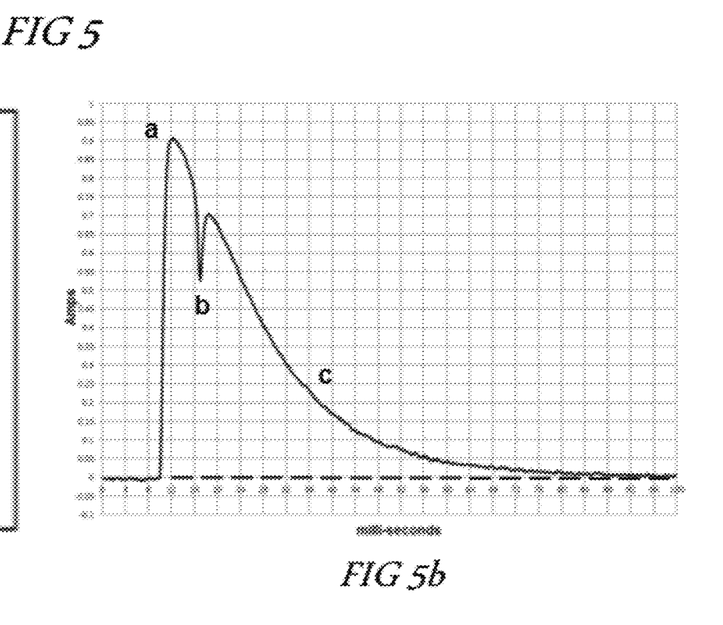

FIG. 5 are current traces to illustrate the difference between the pulsed output current delivered to the DPLS 30 of the present invention by the BSPMAS 50 of FIG. 4 and steady state currents applied to conventional solenoids.

Figure 5A:
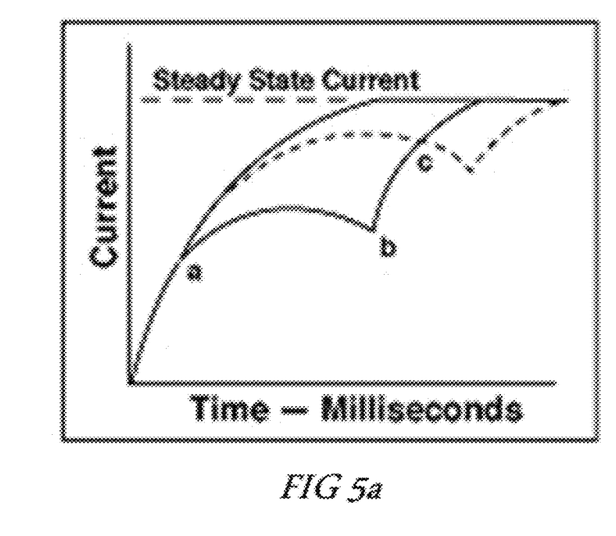

As shown in FIG. 5a when a DC voltage is impressed across the coil in a conventional solenoid, the current will rise to point (a), where the armature motion occurs as represented by the downward current to point (b), then the current moves along trace (c) to a "Steady State Current."

FIG. 5b is a pulsed current trace from a version of a DPLS 30 used in the present invention using the same capacitor/voltage setup and the method of FIG. 4, where FIG. 5b shows the ideal pulsed current trace to the control coils 33a-b for minimum energy usage. In comparison to FIG. 5a, the pulsed current trace in FIG. 5b, does not show a high "Steady State Current" as once the capacitor is discharged, no more or very little power is delivered to the control coils 33a-b. The absent of the "Steady State Current" represents an energy savings over prior art solenoids that are not of the DPLS design.

Figure 6:
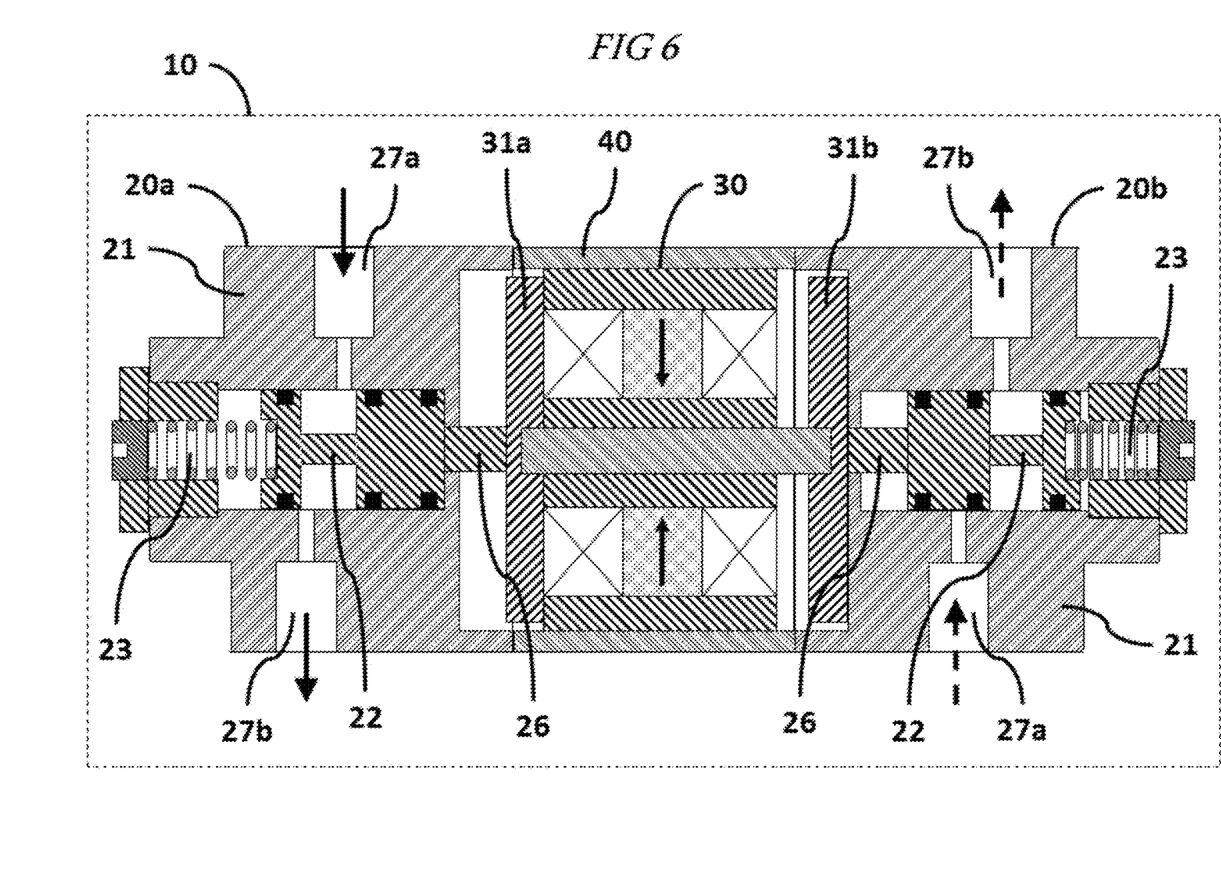
FIGS. 6-7 is FIG. 1 to show the rightward movement of the valve members with the rightward movement of the armature in the DPLS in FIG. 6 and the leftward movement of the valve members with the leftward movement of the armature in the DPLS in FIG. 7.
Figure 7:
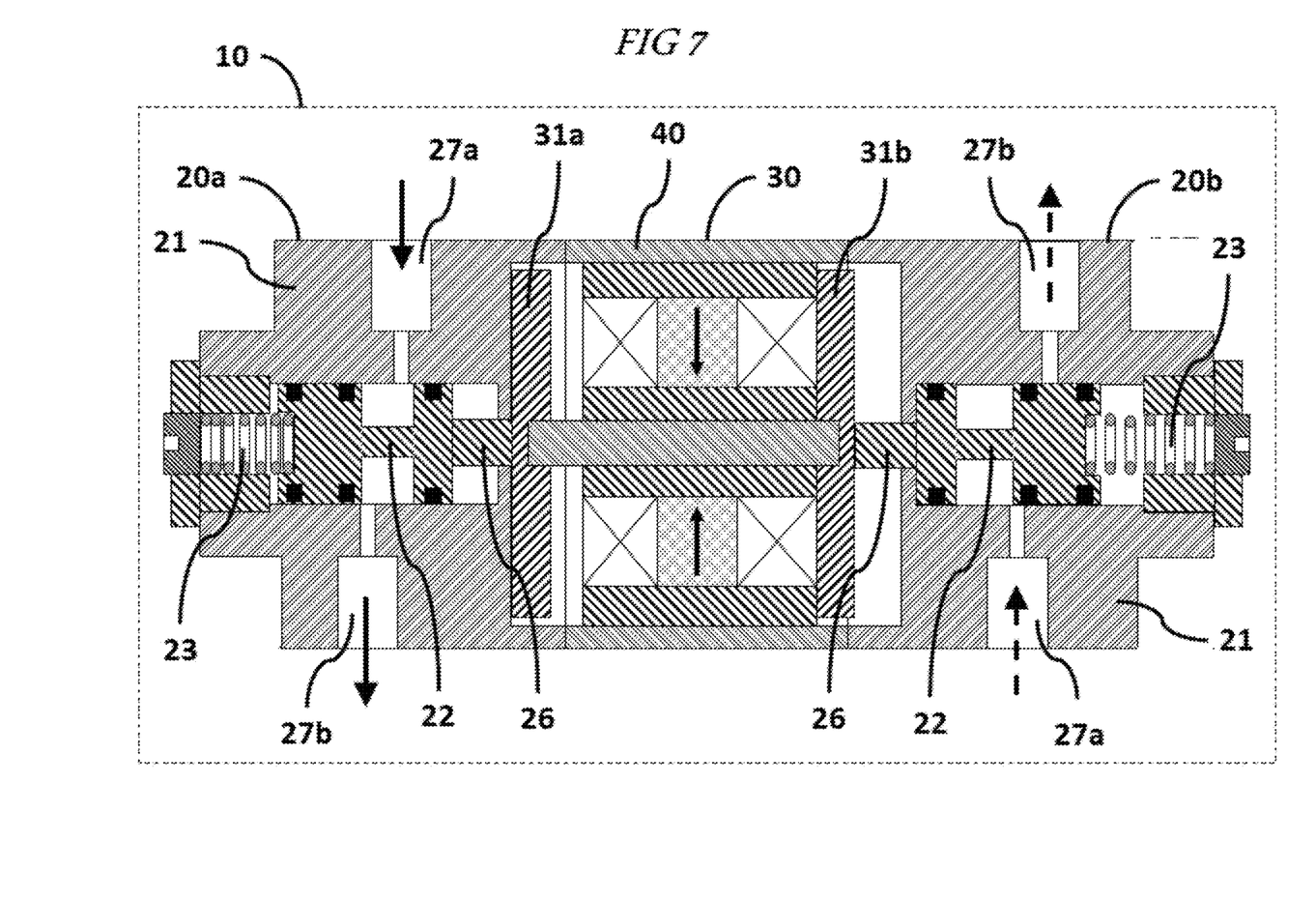

FIG. 6 and FIG. 7 show the present invention with two normally open valves 20(a-b) of FIG. 2a in FIG. 6 and two normally closed valves 20a-b of FIG. 2b in FIG. 7.

It is understood that the two valves 20a-b in the present invention can be one normally opened valve and one normally closed valve.

It is also understood that the housings 21 of the valve 20a and the valve 20b are attached to the DPLS 30 housing 40 by any means appropriate to thinly prevent movement.

In FIG. 6 and with respect to FIG. 3a, the attractive piece 31a is in the magnetically latched position while attractive piece 31b is in the non-magnetically latched position, to cause the poppet 22 in the left valve 20a to be in its normally opened position to allow passage of a medium from port 27a to port 27b, and to cause the poppet 22 in the valve 20b to be in a closed position to prevent passage of a medium from port 27a to port 27b, where the solid arrows at port 27a-b in the left valve 20a represent flow of the medium and the dash arrow at port 27a-b in the right valve 20b represent no-flow of the medium.

In FIG. 7 and with respect to FIG. 3b, the attractive piece 31a is in the non-magnetically latched position while attractive piece 31b is in the magnetically latched position, to cause the poppet 22 in the valve 20b to be in its normally closed position to prevent passage of a medium from port 27a to port 27b, and to cause the poppet 22 in the left valve 20a to be in a opened position to allow passage of a medium from port 27a to port 27b, where the solid arrows at port 27a-b in the valve 20a represent flow of the medium and the dash arrow at port 27a-b in the right valve 20b represent no-flow of the medium.

It is understood that by activating the DPLS 30 in FIG. 6 or FIG. 7 to reverse the latching of the attractive pieces 31a-b will reverse the flow of the medium in the valves 20a-b.

Using the BSPMAS of FIG. 4, operation of the DASV 10 is performed by sending a pulsed current to either control coil 33*a* or 33*b* in the DPLS 30 to cause the armature 31 in the DPLS 30 to move rightward or leftward and facilitate the movements of the poppets 22 in each valve 20*a-b* rightward or leftward, while compressing or decompressing the springs 23 in each valve 20*a-b*.

For example, in FIG. 6, the armature 31 in the DPLS 30 has moved rightward to allow the decompression of spring 23 in valve 20*a* to move the poppet 22 rightward in valve 20*a*, opening flow of the medium though valve 20*a*, while in valve 20*b* the poppet 22 is moved rightward by the movement of the armature 31 in the DPLS 30, closing flow of the medium though valve 20*b* and compressing the spring 23 in valve 20*b*.

In FIG. 7, the armature 31 in the DPLS 30 has moved leftward to move the poppet 22 in valve 20*a* leftward, opening flow of the medium though valve 20*a* and compressing the spring 23 in valve 20*a*, while in valve 20*b* the decompression of the spring 23 in valve 20*b* moves the poppet 22 leftward, closing flow of the medium though valve 20*b*.

It is understood that the reverse leftward or rightward movement of the armature 31 in FIGS. 6-7 cause reverse movement of the poppets 22 in valves 20*a-b*, reverse compression-decompression of the springs 23 in the valves 20*a-b*, and reverse flow of the medium though valves 20*a-b*.

It is also understood that other types of valves can be used in place of the two valves 20*a-b* without changing the scope of the invention.

It is further understood that the moving members in the valves could be physically attached to the armature 31 of the DPLS 30, levitating the need for the springs 23 in the two valves 20*a-b*.

What is claimed is:

1. A dual acting solenoid valve for controlling the flow of a medium through two valves simultaneously comprising:
    a Dual Position Latching Solenoid, comprising at least one control coil, a permanent magnet, dual poles, and an armature;
    a housing, firmly containing the Dual Position Latching Solenoid;
    two valves, each firmly attached to the housing on either side of the Dual Position Latching Solenoid, wherein each valve, a moving member for flow control of a medium through the valves is controlled by the movement of said armature in the Dual Position Latching Solenoid; and
    a pulsed capacitive power circuit to send a rapid current pulse from a capacitor to said control coils of the Dual Position Latching Solenoid to divert the flux from said permanent magnet of the Dual Position Latching Solenoid between the said dual poles of the Dual Position Latching Solenoid to cause movement of said armature of the Dual Position Latching Solenoid in one of two directions;
    where when said current pulse is sent from said capacitor of the pulsed capacitive power circuit to said control coil in the Dual Position Latching Solenoid in a first direction, said armature of the Dual Position Latching Solenoid moves in a first direction to cause the moving member in each valve to move in the same first direction as said armature to control the flows of the medium through each valve in a first direction,
    and when said current pulse is sent from the pulsed power circuit to said control coil in the Dual Position Latching Solenoid is in a second direction, said armature of the Dual Position Latching Solenoid moves in a second direction opposite to the said first direction to cause the moving member in each valve to move in the same said second direction as said armature to control the flows of the medium through each valves in a second direction;
    thus to provide a dual acting solenoid valve to control said flows of the medium through two valves simultaneously.

2. The dual acting solenoid valve of claim 1, wherein the pulsed power circuit is a bi-stable permanent magnet activation system.

* * * * *